Figures 1, 2, 3:
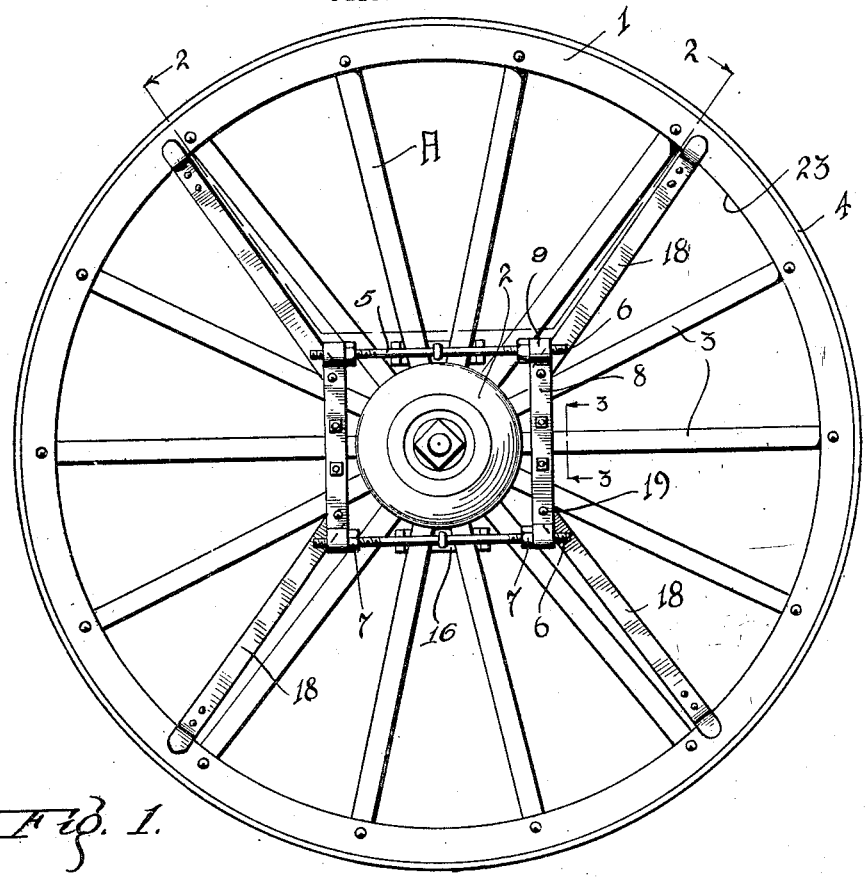

INVENTOR
Albert Renner
BY Munn &Co
ATTORNEYS

Patented June 3, 1924.

1,496,170

UNITED STATES PATENT OFFICE.

ALBERT RENNER, OF MADISON, NEBRASKA.

WHEEL BRACE.

Application filed March 10, 1923. Serial No. 624,198.

*To all whom it may concern:*

Be it known that I, ALBERT RENNER, a citizen of the United States, and a resident of Madison, in the county of Madison and State of Nebraska, have invented a new and useful Improvement in Wheel Braces, of which the following is a full, clear, and exact description.

My invention relates to improvements in wheel braces, and it consists in the combinations, constructions, and arrangements herein described and claimed.

An object of my invention is to provide a device of the character described which may be applied to the ordinary type of wagon or vehicle wheel without the use of special tools, and which is capable of expanding the felly of the wheel to prevent unintentional dislodgment of the rim.

A further object of my invention is to provide a wheel brace of the character described which may be easily removed and which is capable of being folded to a relatively compact form.

A further object of my invention is to provide a wheel brace of the character described that is constructed of strap metal, bolts, and material which may be found in the ordinary blacksmith shop.

Other objects and advantages will appear in the following specification, and the novel features of the invention will be particularly pointed out in the appended claims.

My invention is illustrated in the accompanying drawings, forming part of this application, in which—

Figure 1 is an elevation of an embodiment of my invention operatively applied to a wheel, Figure 2 is a sectional view along the line 2—2 of Figure 1, and Figure 3 is a detail sectional view along the line 3—3 of Figure 1.

In carrying out my invention, I make use of the ordinary type of vehicle wheel A having a felly 1, a hub 2, and a plurality of spokes 3 for separating the felly 1 from the hub 2.

The felly 1 is usually provided with a metal tire 4 if the wheel is a cart wheel, as in the present case, and if the wheel be a vehicle wheel upon which a pneumatic tire is disposed, then the tire 4 is replaced by a metal rim suitable for supporting the pneumatic tire.

It is well known to wheelrights that the ordinary type of wooden or non-metallic wheel shrinks sufficiently to cause the displacement of the tire 4 upon the felly 1. When the tire 4 has become dislodged from its position on the felly 1, the wheel is in great danger of falling to pieces. My present invention provides a means by which the felly 1 may be expanded so that it may contact tightly with the tire 4, thereby preventing unintentional removal of the tire.

My rim tightener consists in a pair of bolts 5 threaded at each end, as shown at 6. Nuts 7 are disposed upon the threaded ends 6 of the bolts 5. These bolts 5 are placed in parallel relation with one another, one on either side of the hub 2. Metal straps 8 having their outer ends rolled to form transverse sleeve portions 9 are disposed in parallel relation with one another and with the threaded portions 6 of the bolts 5 projected through the sleeve portions 9 (see Figure 1). The nuts 7 are disposed on the inside of the quadrangle thus formed.

Means for preventing dislocation of the strap 8 relative to the hub 2 is provided as shown in Figure 3 in a pair of stirrups 10 which are wrapped around diametrically opposed spokes and which have their open ends projected through openings in the strap 8. The stirrup 10 is pulled tightly into engagement with the spoke 3 by means of nuts 12 disposed on the threaded open ends 13 of the stirrup 10. Means for preventing the accidental dislocation of the bolts 5 relative to the hub 2, as shown in Figure 2, consists in bolts 14 having eye portions 15 at one end thereof through which the bolts 5 are projected. The opposite ends of the bolts 14 are threaded and projected through shallow U-shaped clamping members 16, which clamping members are disposed so that each embraces two adjacent spokes 3 (see Figure 1). The bolts 14 are provided with nuts 17 on the threaded portion thereof by means of which the clamping members 16 may be moved into close engagement with the adjacent spokes 3.

Radially extending braces 18 are pivotally mounted, as shown at 19, to the ends of the straps 8, there being four of these radially extending braces.

The outer ends of the braces 18 have claws 20 secured thereto by means of rivets 21. These claws 20 cooperate with the outer ends 22 of the braces 18 to engage with the under surface 23 of the felly 1.

From the foregoing description of the various parts of the device, the operation thereof may be readily understood. Let us assume that the wheel A shown in Figure 1 has been subjected to conditions which have brought about the shrinkage of the felly 1, and that the rim 4 is in danger of becoming dislodged therefrom. In this event, the bolts 5 and the straps 8 are engaged with one another in the manner shown in Figure 1, the stirrups 10 are clamped about the diametrically opposed spokes 3, and the clamping members 16 are tightened so as to closely engage the adjacent spokes 3. The stirrups 10 should not be moved into too close engagement with the spokes, but only sufficiently close to prevent lateral movement of the straps 8, since the stirrups must move longitudinally of the spokes.

The braces 18 are next moved to the relative position shown in Figure 1, that is, the braces are pivoted on their pivotal centers 19 so that their outer ends contact the felly 1 at uniform spaced apart distances. Care should be taken that the claws 20 engage with one face and the under side of the felly 1, and that the outer ends 22 of the braces contact with the opposite face of the felly.

It is then only necessary to turn the nuts 7 on the bolts 5 toward the outer ends of the bolts 5. As the nuts 7 are turned, the straps 8 will move outwardly on the spokes 3 toward the felly 1. This movement of the straps will occasion a like movement of the braces 18 in an outward direction so that the braces will actually force the felly 1 to expand and move outwardly into close engagement with the rim 4.

This wheel brace may be adjusted occasionally so that the felly 1 is at all times in close binding engagement with the rim 4 and the wheel is substantially tight.

I claim:

1. In a wheel having a hub and a felly, a frame mounted concentric with the hub of said wheel, means for manually expanding said frame, clamps for securing said frame against unintentional movement on said wheel, and a plurality of radially extending braces mounted on said frame and engaging with the inner walls of said felly, whereby said felly may be expanded when said frame is expanded.

2. In a vehicle wheel having a felly, a quadrangular frame, clamping means for securing said frame against unintentional movement on said wheel, means for expanding said frame in one direction, and a plurality of braces mounted on the movable sides of said frame and gripping the inner side of said felly, whereby said felly may be expanded when said frame is expanded.

3. In a vehicle wheel having a hub and a felly, a metal frame, means for clamping said frame against unintentional movement concentric with said hub, a plurality of radially extending braces carried by said frame and abutting against the inner surface of said felly, and means for expanding said frame, said means comprising threaded portions at the opposite ends of two sides of said frame, and contacting with the adjacent portions of the remaining two sides of said frame, whereby said frame may be expanded in one direction when said threaded nuts are turned.

ALBERT RENNER.